(12) United States Patent
Jirik (10) Patent No.: US 10,051,788 B2
(45) Date of Patent: Aug. 21, 2018

(54) DUCKWEED REMOVAL AND COLLECTION DEVICE

(71) Applicant: Mark Jirik, Saint Paul, MN (US)

(72) Inventor: Mark Jirik, Saint Paul, MN (US)

(*) Notice: Subject to any disclaimer, the term of this patent is extended or adjusted under 35 U.S.C. 154(b) by 160 days.

(21) Appl. No.: 15/203,114

(22) Filed: Jul. 6, 2016

(65) Prior Publication Data

US 2018/0007833 A1    Jan. 11, 2018

(51) Int. Cl.
*A01D 44/00* (2006.01)
*E02B 15/10* (2006.01)
*B01D 29/27* (2006.01)
*B01D 29/90* (2006.01)
*E02B 15/00* (2006.01)

(52) U.S. Cl.
CPC ............. *A01D 44/00* (2013.01); *B01D 29/27* (2013.01); *B01D 29/90* (2013.01); *E02B 15/00* (2013.01); *E02B 15/107* (2013.01)

(58) Field of Classification Search
CPC ......... A01D 44/00; E02B 15/00; E02B 15/04; E02B 15/106; E02B 15/107; B01D 29/27; B01D 29/90
USPC ........ 210/170.05, 170.09, 242.1, 747.6, 776; 56/8, 9
See application file for complete search history.

(56) References Cited

U.S. PATENT DOCUMENTS

| | | | | |
|---|---|---|---|---|
| 1,571,395 A | * | 2/1926 | Clark .................... | A01D 44/00 56/9 |
| 3,707,070 A | * | 12/1972 | Chaplin ................ | A01D 44/00 56/1 |
| 4,024,063 A | * | 5/1977 | Mori ..................... | E02B 15/106 210/242.1 |
| 4,261,160 A | * | 4/1981 | Niewiera .............. | A01D 44/00 56/8 |
| 4,882,073 A | * | 11/1989 | Griffith ................. | E02B 15/00 210/242.1 |
| 5,197,263 A | * | 3/1993 | Midtling ............... | A01D 44/00 56/8 |
| 7,022,223 B2 | * | 4/2006 | Lovestead .......... | B01D 21/0027 210/170.05 |
| 7,947,173 B2 | * | 5/2011 | Deng ........................ | C02F 1/38 210/170.05 |
| 8,287,740 B2 | * | 10/2012 | Newman ............... | A01D 44/00 210/242.1 |

(Continued)

*Primary Examiner* — Christopher Upton
(74) *Attorney, Agent, or Firm* — Johnson and Phung LLC; Thomas N. Phung (57) ABSTRACT

Apparatus for removal and collection of duckweed from a body of water comprising an engine, a turbine duckweed collection assembly having a housing with a duckweed collection inlet, a duckweed discharge outlet, and a well located between collection inlet and discharge outlet, a series of spaced elements supported on a rotatable shaft and located within well with the shaft connected to the combustible engine to rotationally drive spaced elements within well to create a vortex pumping action in the body of water drawing free floating duckweed into collection inlet, through well and out from discharge outlet, a platform supporting combustible engine and turbine duckweed collection assembly in an upright condition, and a collection manifold assembly connected to discharge outlet and includes a water permeable collection bag receiving and collecting duckweed while allowing water to escape therethrough and return back to the body of water.

16 Claims, 7 Drawing Sheets

(56) References Cited

U.S. PATENT DOCUMENTS

2003/0062319 A1* 4/2003 Keller .................. B01D 29/27
210/170.09

* cited by examiner

DUCKWEED REMOVAL AND COLLECTION DEVICE

FIELD OF THE INVENTION

The present invention is directed to the control of pond and lake weeds and more specifically to an apparatus for the removal and collection of duckweed from a body of water such as a pond or a lake.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

Free-floating lake weeds and duckweed are fast growing fresh water plants that are invasive to water ponds, lakes, a slow moving rivers. For example under ideal conditions, the surface area covered by duckweed can double in less than 2 days. As such it doesn't take long for free-floating lake weeds and duckweed to overrun a pond or small lake thereby creating an unattractive nuisance while also blocking off sunlight for competing water plants.

It has been recently widely recognized that duckweed may be used as a valuable high-protein food source such as feed for fish (carp), poultry (chickens, ducks), livestock (pigs), and humans since duckweed contains high levels of protein, fat, nitrogen, and phosphorus. Duckweed also contains higher amounts of essential amino acids than most plants.

The removal of duckweed and other free-floating lake weeds from a body of water traditionally is done by hand and involves the use of hand nets which are thrown out from a shoreline of the pond or lake and pulled back in, which is labor intensive. Another technique involves the use of a small pontoon like watercraft in which a user would navigate the watercraft around the pond or small lake to either collect duckweed or push the duckweed closer to shore and into a collection container. Although the use of such watercraft is more efficient than the use of nets for the removal of duckweed and other free-floating lake weeds, the process is also labor intensive as it requires constant and continuous user operation.

In view of the above there is a need for a machine that can cost effectively remove and collect duckweed and other free floating lake weeds from a body of water to not only clean up the body of water but also to harvest the duckweed for use as food source for animal fee and human consumption.

BRIEF SUMMARY OF THE INVENTION

The present invention comprises apparatus for the removal and collection of duckweed and other free floating lake weeds from a body of water and generally includes an internal combustible engine, a turbine duckweed collection assembly, and a collection manifold assembly.

The turbine duckweed collection assembly includes a housing having a duckweed collection inlet, a duckweed discharge outlet, a well located between the duckweed collection inlet and duckweed discharge outlet, a discharge passage located between the well and the duckweed discharge outlet, a flow control valve located between the discharge passage and the duckweed discharge outlet, and a series of spaced elements supported on a rotatable shaft and located within the well of the housing.

The series of spaced elements comprise a set of suction and grinding disks located proximal the duckweed collection inlet, a set of engaging prime maintaining slotted disks located adjacent the set of suction and grinding disks, a set of discharge feeding deeply fluted disks located adjacent the set of prime maintaining slotted disks and adjacent the discharge passage, a water sealing blank disk, and a water equilibrium maintaining fluted disk located between the water sealing blank disk and the set of discharge feeding deeply fluted disks.

The shaft supporting the series of spaced elements is also connected to the internal combustible engine to rotationally drive the disks within the well to create a vortex pumping action in a body of water drawing free floating duckweed into the duckweed collection inlet, through the well, through the discharge passage and out from the duckweed discharge outlet and to the collection manifold assembly which includes a water permeable collection bag receiving and collecting the duckweed while allowing water to escape therethrough and return back to said body of water.

The apparatus for the removal and collection of duckweed from a body of water also includes a platform supporting the internal combustible engine and the turbine duckweed collection assembly in an upright condition on a support surface and a floatation device supporting and maintaining the internal combustible engine and the turbine duckweed collection assembly in an upright condition in the body of water during use.

DESCRIPTION OF THE PREFERRED EMBODIMENT

Figure 1:
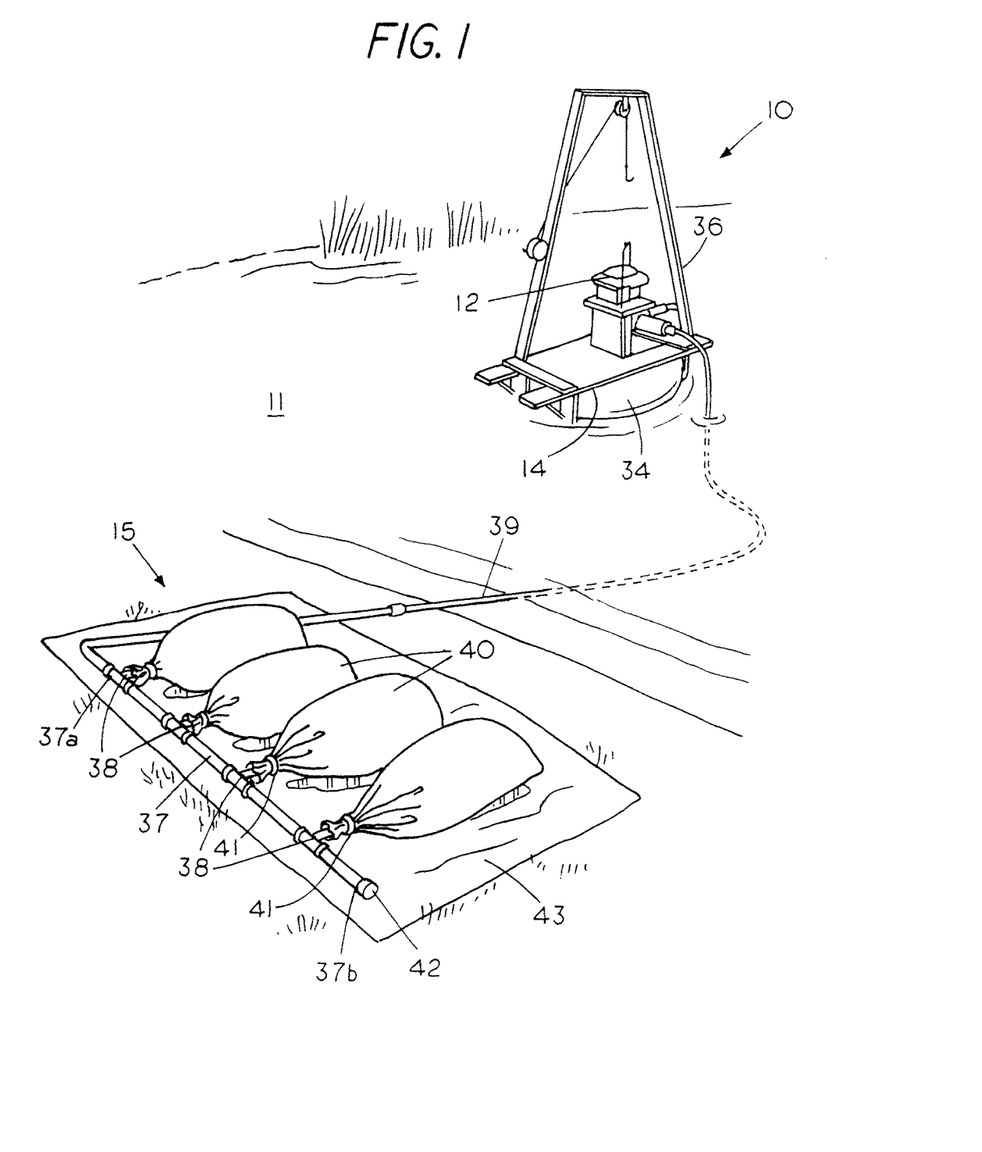
FIG. 1 is a perspective view showing duckweed removal and collection apparatus.
Figure 2:
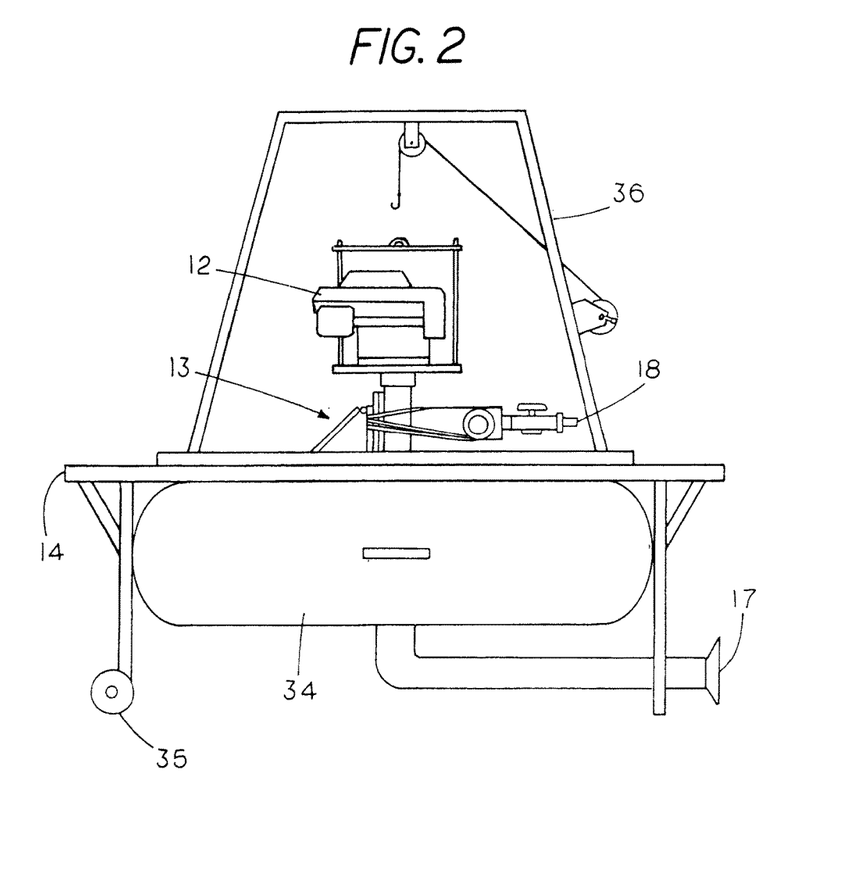
FIG. 2 is a side view showing the in water portion of duckweed removal and collection apparatus of FIG. 1.
Figure 3:
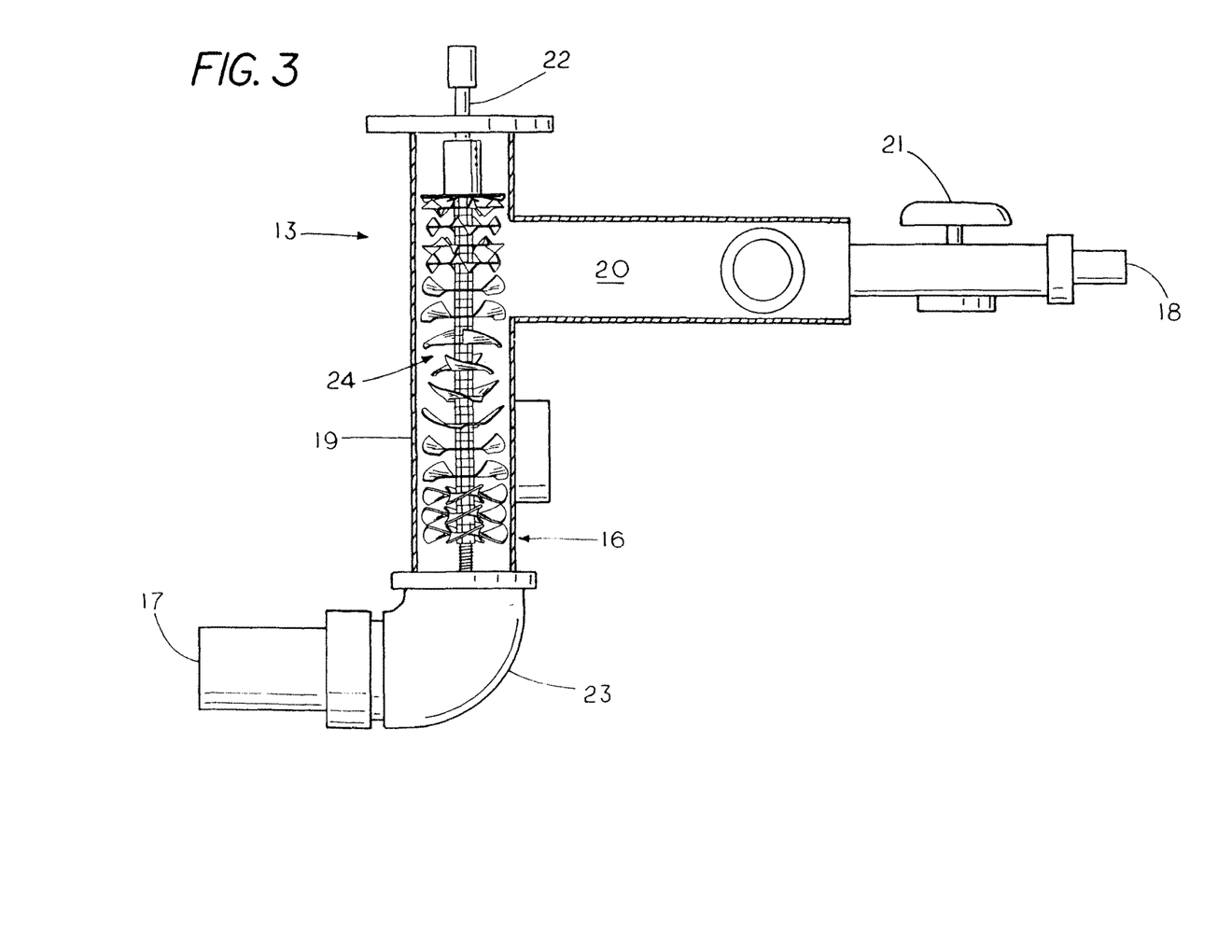
FIG. 3 is a close-up partial cross-sectional view showing the main components of the turbine duckweed collection assembly of FIG. 1.

Referring to FIGS. 1, 2, and 3, FIG. 1 is a perspective view showing an embodiment of duckweed removal and collection apparatus 10 of the present invention in use in a body of water. When in use duckweed removal and collection apparatus 10 includes an in the water portion and an on land portion comprising a collection manifold assembly 15.

FIG. 2 is a side view showing the in water portion of duckweed removal and collection apparatus 10, which generally comprises an internal combustible engine 12, a turbine duckweed collection assembly 13, a platform 14 supporting the internal combustible engine 12 and turbine duckweed collection assembly 13 in an upright condition on a support surface such as a bottom surface of body of water 11. In the embodiment of FIGS. 1 and 2 the internal combustible engine 12 comprises a preferred an output range of 1,200-3,400 rpm (Rotations Per Minute) and preferably includes a tachometer, a maintenance timer, a water pressure gauge, and a throttle lock although such devices are not required in alternative embodiments.

FIG. 3 is a close-up partial cross-sectional view showing the main components of turbine duckweed collection assembly 13, which generally comprises a housing 16 having a duckweed collection inlet 17, a duckweed discharge outlet 18, a well 19 located between the duckweed collection inlet 17 and duckweed discharge outlet 18, a discharge passage 20 located between the well 19 and the duckweed discharge outlet 18, and an optional flow control valve 21 located between the discharge passage 20 and the duckweed discharge outlet 18. In the embodiment of FIGS. 1,2, and 3 the components of housing 16 preferably comprise high strength polymer plastic pipe fittings secured together in an adhesiveless fashion with the use of a high strength ratchet strap. It is noted that alternative embodiments of the present invention may include a strapless connection such as through the use of adhesive, heat and other types of bonding.

Located within well 19 is a series of spaced elements 24 supported on a rotatable shaft 22 that is connected to internal combustible engine 12 to rotationally drive the series of spaced elements 24 within well 19 to create a vortex pumping action in body of water 11 drawing free floating duckweed in body of water 11 into the duckweed collection inlet 17, through well 19 and out from the duckweed discharge outlet 18.

In the embodiment of FIG. 3 turbine duckweed collection assembly 13 is also shown to include a reinforced shock-resistant 90 degrees piping elbow 23 connecting the duckweed collection inlet 17 to a first end of well 19.

Figure 4:
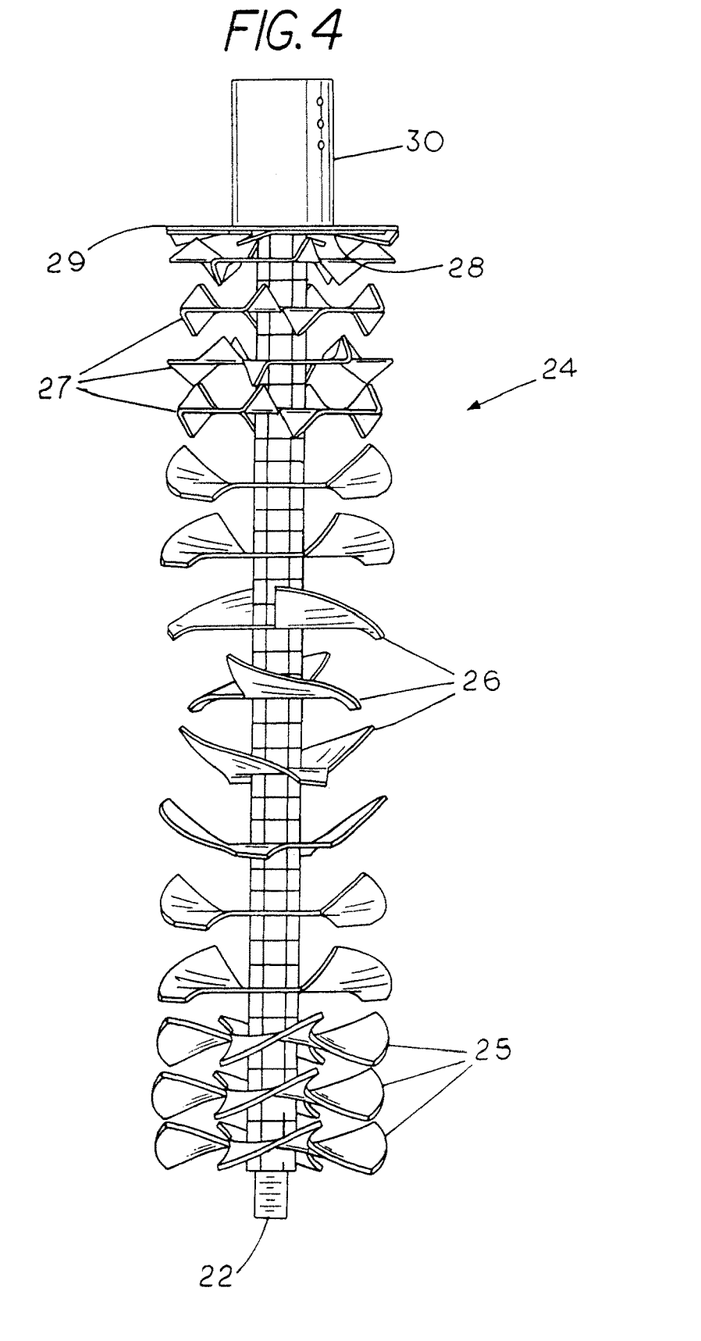
FIG. 4 is a close-up side view showing a series of spaced elements supported on a rotatable shaft and located within the well of the turbine duckweed collection assembly.

FIG. 4 show a close-up side view of an embodiment of the series of spaced elements 24 which generally comprises a set of three suction and grinding disks 25 located proximal the duckweed collection inlet 17, a set of eight prime maintaining slotted disks 26 located adjacent the set of suction and grinding disks 25, a set of four discharge feeding deeply fluted disks 27 located adjacent the set of prime maintaining slotted disks 26 and adjacent the duckweed discharge passage 20, a water sealing blank disk 29, and a water equilibrium maintaining fluted disk 28 located between the water sealing blank disk 29 and the set of discharge feeding deeply fluted disks 27.

Figure 5:
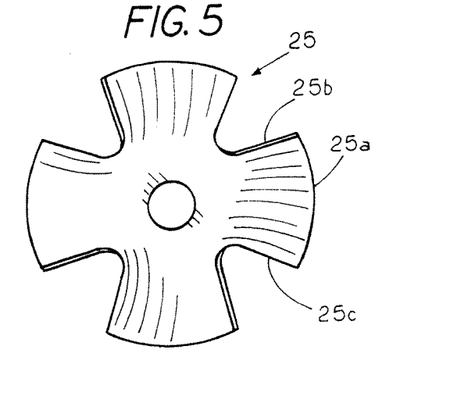
FIG. 5 shows a top view side view of a suction and grinding disk.
Figure 5A:
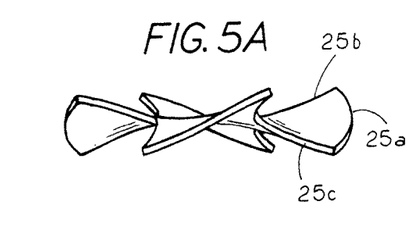
FIG. 5A shows a perspective side view of the suction and grinding disk of FIG. 5.

FIG. 5 shows a top view and FIG. 5A shows a perspective side view of the suction and grinding disk 25, which generally is formed from a stronger material such as but not limited to 10 gauge steel and includes 4 blades with each blade having ends 25b, 25c that are fluted or bent at a slight opposing angles with respect to each other with the definition for the phrase slight opposing angles as comprising preferably between 10-45 degrees. In the embodiment of FIG. 3 the suction and grinding disk 25 of turbine duckweed collection assembly 13 function to assist in the creation of the vortex proximal the duckweed collection inlet 17 thereby resulting in a pumping action within well 19 to draw in the duckweed containing water of body of water 11. Once in well 19 suction and grinding disk 25 also functions to chop or grind up larger clumps of duckweed that come into contact with the ends 25b, 25c of blade 25 after which the duckweed containing water is directed towards prime maintaining slotted disks 26.

Figure 6:
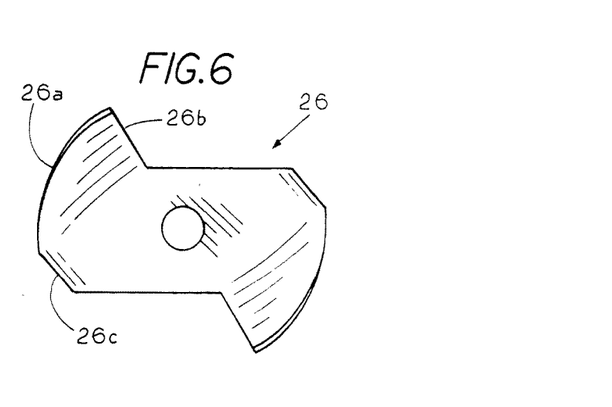
FIG. 6 shows a top view of a prime maintaining slotted disks.
Figure 6A:
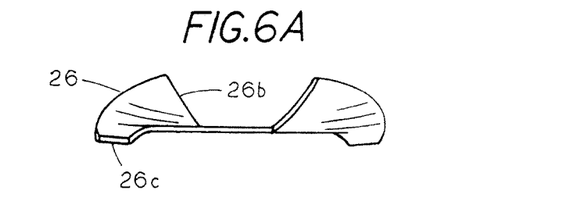
FIG. 6A shows a perspective side view of the prime maintaining slotted disks of FIG. 6.

FIG. 6 shows a top view and FIG. 6A shows a perspective side view of the prime maintaining slotted disks 26, which generally includes 2 blades each blade having ends 26b, 26c that are fluted or bent at an opposing angles, preferably between 15-60 degrees with respect to each other. Prime maintaining slotted disks 26 may be form from the same material as suction and grinding disk 25 or preferably from a slightly weaker material such as but not limited to 16-gauge steel. In the embodiment of FIG. 3 the prime maintaining slotted disks 26 of turbine duckweed collection assembly 13 functions to assist in the grinding of material such as weeks, maintaining the water column in well 19 while also maintaining a water flow by a centrifugal force created by the rotation of the prime maintaining slotted disks 26.

Figure 7:
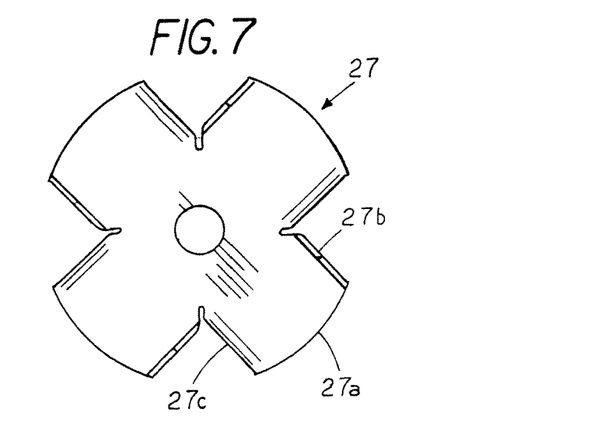
FIG. 7 shows a top view of a four discharge feeding deeply fluted disks.
Figure 7A:
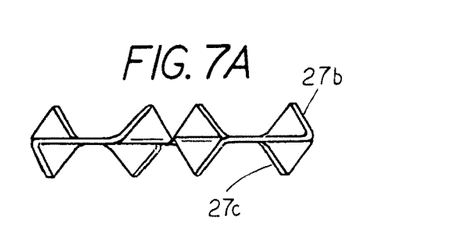
FIG. 7A shows a perspective side view of the four discharge feeding deeply fluted disks of FIG. 7.

FIG. 7 shows a top view and FIG. 7A shows a perspective side view of the four discharge feeding deeply fluted disks 27, which generally includes 4 blades each blade having ends 27b, 27c that are deeply fluted or bent at an opposing angles, such as preferably in a 90 degrees direction with respect to each other. Discharge feeding deeply fluted disks 27 may be form from the same material as suction and grinding disk 25 or preferably from a slightly weaker material such as but not limited to 14-gauge steel. In the embodiment of FIG. 3 the discharge feeding deeply fluted disks 27 of turbine duckweed collection assembly 13 functions to take water pressure off of the other disks and assisting in maintaining water pressure within well 19 at equilibrium while to direct the flow of water and materials into discharge passage 20.

Figure 8:
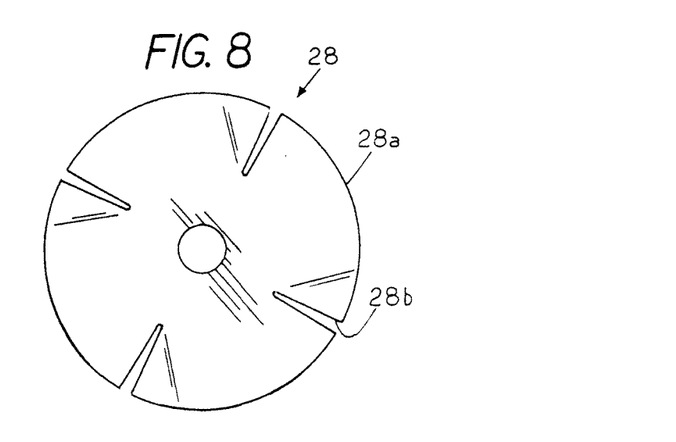
FIG. 8 shows a top view of a water equilibrium maintaining fluted disk.
Figure 8A:
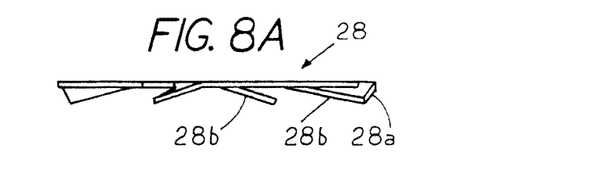
FIG. 8A shows a perspective side view of the water equilibrium maintaining fluted disk of FIG. 8.

FIG. 8 shows a top view and FIG. 8A shows a perspective side view of the water equilibrium maintaining fluted disk 28, which generally includes 4 blades 28a with each blade having a partially downwardly fluted or bent end 28b, preferably between 5-45 degrees. Water equilibrium maintaining fluted disk 28 may be form from the same material as discharge feeding deeply fluted disks 27. In the embodiment of FIG. 3 the water equilibrium maintaining fluted disk 28 of turbine duckweed collection assembly 13 functions to assist in maintaining water equilibrium within well 19.

Figures 9, 9A:
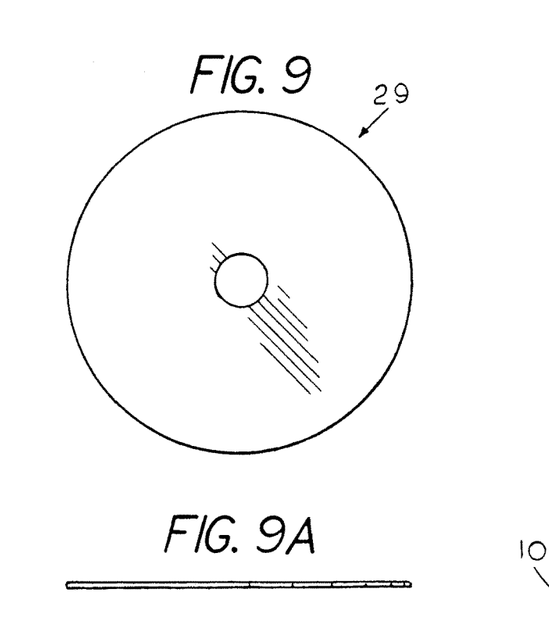
FIG. 9 shows a top view of a water-sealing blank disk.
FIG. 9A shows a perspective side view of the water sealing blank disk of FIG. 9.

FIG. 9 shows a top view and FIG. 9A shows a perspective side view of the water sealing blank disk 29, which may be form from the same material as discharge feeding deeply fluted disks 27 and functions to prevent water flow within well 19 from going out of turbine duckweed collection assembly 13 towards engine 12.

Figure 10:
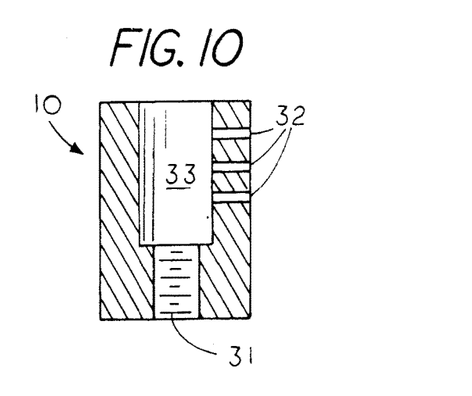
FIG. 10 shows a cross-sectional view a hub, which functions to maintain the series of spaced elements to the rotatable shaft.
Figure 10A:
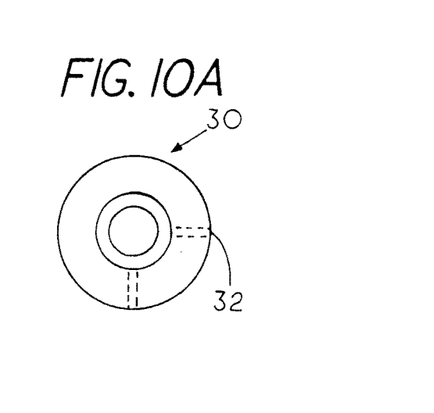
FIG. 10A shows a top view of the hub 30 of FIG. 10.

FIG. 10 shows a cross-sectional view and FIG. 10A shows a top view of a hub 30 which functions to maintain the series of spaced elements 24 to rotatable shaft 22. Hub 30 is shown including a first threaded interior 31 for rotational mating attachment to an end of rotatable shaft 22, a second interior 33 for attachment to an end of an engine shaft (not shown), and a set of screw holes 32 extending into hub 30 in a direction perpendicular to second interior 33 with set of screw holes 32 functioning to support securing screws therein to maintain the attachment of hub 30 to the engine shaft.

Referring back to FIGS. 1 and 2, the embodiment of a duckweed removal and collection apparatus 10 is also shown including a floatation device 34 such as but not limited to an inner tub for supporting and maintaining internal combustible engine 12 and turbine duckweed collection assembly 13 in an upright condition in body of water 11. Although floatation device 34 is shown mounted to an underside of platform 14, floatation device 34 may be mounted to other parts of the platform 14 in alternative embodiments. Platform 14 is also shown including a set of removable wheels 35 for assisting in the transportation of duckweed removal and collection apparatus 10 and a derrick lifting assembly 36 removably attached to platform 14 for assisting in the maintenance of internal combustible engine 12.

Referring back to FIG. 1, the embodiment of duckweed removal and collection apparatus 10 is shown with collection manifold assembly 15, which is located on land, comprising a collection manifold body 37 having a first end, 37a, a second end 37b and a plurality of outlets 38 that are shown extending at an angle to collection manifold body 37 for receiving fluids containing Duckweed. The first end 37a of collection manifold body 37 is shown connected to the duckweed discharge outlet 18 of turbine duckweed collection assembly 13 by a collection hose 37. The second end 37b of collection manifold body 37, which also may function as an excess water outlet for collection manifold body 37 when uncapped, is shown closed by a water sealing cap 42. Each of the plurality of outlets 38 of collection manifold body 37 is shown having a water permeable collection container such as burlap bags 40 connected thereto to filter out and collect the Duckweed while allowing water to flow or permeate therethrough and return back to body of water 11. Each of the burlap bags 40 are shown secured to outlets 38 by a fastening device such as a cable tie 41.

In the operation of duckweed removal and collection apparatus 10 internal combustible engine 12 operated to rotationally drive the series of spaced elements 24 within well 19 to create a vortex pumping action in body of water 11 drawing free floating duckweed in body of water 11 into the duckweed collection inlet 17, through well 19 and out from the duckweed discharge outlet 18, through collection hose 39 and into collection manifold body 37 and out of each of the plurality of outlets 38 of collection manifold body 37 and into burlap bags 40. Once in burlap bags 40, the duckweed are filter out from the water and are collected by the burlap bags 40 while the water are allow to escape therefrom and return back to body of water 11. In order to prevent or reduce soil or land erosion, collection manifold assembly 15 may include an optional erosion protected lining such as plywood, a plastic sheet or tarp 43 supported underneath the water permeable collection container such as burlap bags 40 and preferably extending proximal the water line of body of water 11.

Unlike the traditional techniques of duckweed and other free-floating lake weeds removal which require continuous user operations, the use of duckweed removal and collection apparatus 10 is stationary and is almost labor free for the user between the initial set up and the emptying of the duckweed from burlap bags 40 after duckweed collection as the user can leave once the duckweed removal and collection apparatus 10 is up and running as the duckweed removal and collection apparatus 10 will automatically shut down after internal combustible engine 12 uses up all the fuel in the fuel tank.

More specifically, the operation of duckweed removal and collection apparatus 10 typically involves placing the collection manifold assembly 15 on the shore proximal the body of water 11 and placing the water portion of the duckweed removal and collection apparatus 10 into the body of water 11 such as by wheeling platform 14 in body of water 11 at a depth of between 2 inches to 4 feet and preferably 6-12 inches in water depth. The collection manifold body 37 is then connected to the turbine duckweed collection assembly 13 by collection hose 37, which preferably comprises a 2-inch flexible hose.

Internal combustible engine 12 is then started and the throttle is locked at between 1,200 to 3,400 rpm and preferably 1,800 rpm which results in a turbine of the engine operating to rotationally drive the series of spaced elements 24 within well 19 to create a vortex pumping action in body of water 11 drawing free floating duckweed in body of water 11 into the duckweed collection inlet 17, through well 19 and out from the duckweed discharge outlet 18, through collection hose 39 and into collection manifold body 37 and out of each of the plurality of outlets 38 of collection manifold body 37 and into burlap bags 40. Once in burlap bags 40, the duckweed are filter out from the water and are collected by the burlap bags 40 while the water are allow to escape therefrom and return back to body of water 11.

I claim:

1. Apparatus for the removal and collection of duckweed from a body of water comprising:
    a internal combustible engine;
    a turbine duckweed collection assembly comprising a housing having a duckweed collection inlet, a duckweed discharge outlet, and a well located between said duckweed collection inlet and duckweed discharge outlet, a series of spaced elements supported on a rotatable shaft, said series of spaced elements located within said well, said shaft connected to said internal combustible engine to rotationally drive said series of spaced elements within said well to create a vortex pumping action in a body of water drawing free floating duckweed into said duckweed collection inlet, through said well and out from said duckweed discharge outlet;
    a platform supporting said internal combustible engine and said turbine duckweed collection assembly in an upright condition on a support surface;
    a collection manifold assembly connected to said duckweed discharge outlet, said collection manifold assembly including a water permeable collection container receiving, filtering and collecting said duckweed while allowing water to escape therethrough and return back to said body of water.

2. The apparatus for the removal and collection of duckweed of claim 1 wherein said platform includes a floatation device supporting and maintaining said internal combustible engine and said turbine duckweed collection assembly in an upright condition in said body of water.

3. The apparatus for the removal and collection of duckweed of claim 1 wherein said platform includes a set of removable wheels assisting in the transportation of said apparatus.

4. The apparatus for the removal and collection of duckweed of claim 1 wherein said platform includes a derrick lifting assembly removably attached to said platform assisting in the maintenance of said internal combustible engine.

5. The apparatus for the removal and collection of duckweed of claim 1 wherein said housing of said turbine duckweed collection assembly comprises high strength polymer plastic pipefittings.

6. The apparatus for the removal and collection of duckweed of claim 5 wherein said polymer plastic pipe fittings of said housing are secured together in an adhesiveless fashion with the use of a high strength ratchet strap.

7. The apparatus for the removal and collection of duckweed of claim 1 wherein said internal combustible engine includes a tachometer, a maintenance timer, a water pressure gauge, and a throttle lock.

8. The apparatus for the removal and collection of duckweed of claim 1 wherein said internal combustible engine comprises a preferred range of 1,200-3,400 rpm (Rotations Per Minute).

9. Apparatus for the removal and collection of duckweed from a body of water comprising:
   a internal combustible engine;
   a turbine duckweed collection assembly comprising a housing having a duckweed collection inlet, a duckweed discharge outlet, a well located between said duckweed collection inlet and duckweed discharge outlet, a discharge passage located between said well and said duckweed discharge outlet, a flow control valve located between said discharge passage and said duckweed discharge outlet, and a series of spaced elements supported on a rotatable shaft and located within said well, said series of spaced elements including a set of suction and grinding disks located proximal said duckweed collection inlet, a set of engaging prime maintaining slotted disks located adjacent said set of suction and grinding disks, a set of discharge feeding deeply fluted disks located adjacent said set of prime maintaining slotted disks and adjacent said discharge passage, a water sealing blank disk, and a water equilibrium maintaining fluted disk located between said water sealing blank disk and said set of discharge feeding deeply fluted disks, said shaft connected to said internal combustible engine to rotationally drive said disks within said well to create a vortex pumping action in a body of water drawing free floating duckweed into said duckweed collection inlet, through said well, through said discharge passage and out from said duckweed discharge outlet;
   a platform supporting said internal combustible engine and said turbine duckweed collection assembly in an upright condition on a support surface;
   a floatation device supporting and maintaining said internal combustible engine and said turbine duckweed collection assembly in an upright condition in said body of water;
   a collection manifold assembly connected to said duckweed discharge outlet, said collection manifold assembly including a water permeable collection container receiving, filtering and collecting said duckweed while allowing water to escape therethrough and return back to said body of water.

10. The apparatus for the removal and collection of duckweed of claim 9 wherein said series of spaced elements supported on a rotatable shaft comprises a set of three suction and grinding disks located proximal said duckweed collection inlet, a set of eight prime maintaining slotted disks located adjacent said of suction and grinding disks, a set of four discharge feeding deeply fluted disks located adjacent said prime maintaining slotted disks and adjacent said duckweed discharge outlet, a water sealing blank disk, and a water equilibrium maintaining fluted disk located between said water sealing blank disk and said discharge feeding deeply fluted disks.

11. The apparatus for the removal and collection of duckweed of claim 10 including a reinforced shock-resistant 90 degrees piping elbow connecting said duckweed collection inlet to a first end of said well.

12. The apparatus for the removal and collection of duckweed of claim 11 wherein said platform includes a set of removable wheels assisting in the transportation of said apparatus.

13. The apparatus for the removal and collection of duckweed of claim 12 wherein said housing of said turbine duckweed collection assembly comprises high strength polymer plastic pipe fittings secured together in an adhesiveless fashion with the use of a high strength ratchet strap.

14. The apparatus for the removal and collection of duckweed of claim 13 wherein said platform includes a derrick lifting assembly removably attached to said platform assisting in the maintenance of said internal combustible engine.

15. The apparatus for the removal and collection of duckweed of claim 14 wherein said internal combustible engine includes a tachometer, a maintenance timer, a water pressure gauge, and a throttle lock.

16. Apparatus for the removal and collection of duckweed from a body of water comprising:
   an internal combustible engine that includes a tachometer, a maintenance timer, a water pressure gauge, and a throttle lock;
   a turbine duckweed collection assembly comprising a housing having a duckweed collection inlet, a duckweed discharge outlet, a well located between said duckweed collection inlet and duckweed discharge outlet, a discharge passage located between said well and said duckweed discharge outlet, a flow control valve located between said discharge passage and said duckweed discharge outlet, and a series of spaced elements supported on a rotatable shaft and located within said well, said series of spaced elements including a set of three suction and grinding disks located proximal said duckweed collection inlet, a set of eight prime maintaining slotted disks located adjacent said of suction and grinding disks, a set of four discharge feeding deeply fluted disks located adjacent said prime maintaining slotted disks and adjacent said duckweed discharge outlet, a water sealing blank disk, and a water equilibrium maintaining fluted disk located between said water sealing blank disk and said discharge feeding deeply fluted disks, said shaft connected to said internal combustible engine to rotationally drive said disks within said well to create a vortex pumping action in a body of water drawing free floating duckweed into said duckweed collection inlet, through said well, through said discharge passage and out from said duckweed discharge outlet;

a reinforced shock-resistant 90 degrees piping elbow connecting said duckweed collection inlet to a first end of said well;

a platform supporting said internal combustible engine and said turbine duckweed collection assembly in an upright condition on a support surface, said platform including a set of removable wheels assisting in the transportation of said apparatus;

a floatation device supporting and maintaining said internal combustible engine and said turbine duckweed collection assembly in an upright condition in said body of water;

a derrick lifting assembly removably attached to said platform for assisting in the maintenance of said internal combustible engine;

a collection manifold assembly connected to said duckweed discharge outlet, said collection manifold assembly including a water permeable collection bag receiving and collecting said duckweed while allowing water to escape therethrough and return back to said body of water.

* * * * *